US010929860B2

(12) United States Patent
Hansen et al.

(10) Patent No.: US 10,929,860 B2
(45) Date of Patent: Feb. 23, 2021

(54) VIEWED LOCATION METRIC GENERATION AND ENGAGEMENT ATTRIBUTION WITHIN AN AR OR VR ENVIRONMENT

(71) Applicant: Adobe Inc., San Jose, CA (US)

(72) Inventors: Joshua Aaron Hansen, Provo, UT (US); William Brandon George, Pleasant Grove, UT (US); Kevin Gary Smith, Lehi, UT (US)

(73) Assignee: Adobe Inc., San Jose, CA (US)

( * ) Notice: Subject to any disclaimer, the term of this patent is extended or adjusted under 35 U.S.C. 154(b) by 685 days.

(21) Appl. No.: 15/472,120

(22) Filed: Mar. 28, 2017

(65) Prior Publication Data

US 2018/0285890 A1 Oct. 4, 2018

(51) Int. Cl.
*G06Q 30/02* (2012.01)
*G06F 16/29* (2019.01)
(Continued)

(52) U.S. Cl.
CPC ......... *G06Q 30/0201* (2013.01); *G06F 3/012* (2013.01); *G06F 3/013* (2013.01);
(Continued)

(58) Field of Classification Search
CPC ............ G06Q 30/0201; G06Q 30/0277; G06F 3/0481; G06F 3/012; G06F 3/013;
(Continued)

(56) References Cited

U.S. PATENT DOCUMENTS 6,446,862 B1 * 9/2002 Mann ................. G07C 9/00087
235/380
6,741,967 B1 * 5/2004 Wu ........................ G06Q 30/02
705/1.1
(Continued)

OTHER PUBLICATIONS

"An eye-fixation analysis of choice processes for consumer nondurables" JE Russo, F Leclerc—Journal of consumer research, 1994—academic.oup.com (Year: 1994).*

(Continued)

*Primary Examiner* — Jonathan G Sterrett
(74) *Attorney, Agent, or Firm* — FIG. 1 Patents

(57) ABSTRACT

View location metric generation and engagement attribution within an AR or VR environment are described. In one example, a system of a digital medium environment is configured to generate metric data describing viewed locations within an augmented or virtual reality environment. The system includes a log data collection module implemented at least partially in hardware of a computing device to collect log data from a plurality of user devices. The log data describes locations associated with an augmented or virtual reality environment and a viewing direction at corresponding locations. The system also includes a metric generation module implemented at least partially in hardware of the computing device to generate metric data describing viewed locations within the augmented or virtual reality environment by the plurality of user devices and an output module implemented at least partially in hardware of the computing device to output the generated metric data.

20 Claims, 9 Drawing Sheets

US 10,929,860 B2
Page 2

(51) Int. Cl.
*G06F 16/56* (2019.01)
*G06F 16/58* (2019.01)
*G06F 16/9537* (2019.01)
*G06F 3/01* (2006.01)
*G06F 3/0484* (2013.01)
*G06F 3/0481* (2013.01)

(52) U.S. Cl.
CPC ........ *G06F 3/0481* (2013.01); *G06F 3/04842* (2013.01); *G06F 16/29* (2019.01); *G06F 16/56* (2019.01); *G06F 16/5866* (2019.01); *G06F 16/9537* (2019.01); *G06Q 30/0277* (2013.01)

(58) Field of Classification Search
CPC ............. G06F 3/04842; G06F 16/9537; G06F 16/5866; G06F 16/56; G06F 16/29
See application file for complete search history.

(56) References Cited

U.S. PATENT DOCUMENTS

| | | | |
|---|---|---|---|
| 7,460,940 B2* | 12/2008 | Larsson | A61B 3/113 180/272 |
| 7,930,199 B1* | 4/2011 | Hill | G06Q 30/02 705/7.29 |
| 8,396,744 B2* | 3/2013 | Pradeep | G06Q 30/0242 705/14.41 |
| 8,412,656 B1* | 4/2013 | Baboo | G06Q 30/0201 706/20 |
| 8,615,479 B2* | 12/2013 | Jung | A61B 5/04842 706/46 |
| 2005/0273376 A1* | 12/2005 | Ouimet | G06Q 10/04 705/7.31 |
| 2006/0093998 A1* | 5/2006 | Vertegaal | G06F 3/011 434/236 |
| 2006/0189886 A1* | 8/2006 | Jones | A61B 3/113 600/558 |
| 2008/0104415 A1* | 5/2008 | Palti-Wasserman | G06F 21/32 713/186 |
| 2008/0259274 A1* | 10/2008 | Chinnock | A61B 3/14 351/206 |
| 2009/0063256 A1* | 3/2009 | Pradeep | G06Q 30/02 705/7.32 |
| 2009/0112616 A1* | 4/2009 | Jung | G16H 50/20 705/2 |
| 2009/0118593 A1* | 5/2009 | Jung | G06Q 50/22 600/300 |
| 2009/0132275 A1* | 5/2009 | Jung | A61B 5/16 705/2 |
| 2009/0141895 A1* | 6/2009 | Anderson | G06F 21/84 380/252 |
| 2009/0271251 A1* | 10/2009 | Sorensen | G06Q 30/02 348/14.01 |
| 2010/0004977 A1* | 1/2010 | Marci | A61B 5/16 705/7.32 |
| 2010/0100001 A1* | 4/2010 | Aguilar | A61B 3/113 600/544 |
| 2010/0205043 A1* | 8/2010 | Edwards | G06Q 30/0201 705/7.29 |
| 2011/0085700 A1* | 4/2011 | Lee | G06O 30/02 382/103 |
| 2011/0237971 A1* | 9/2011 | Pradeep | A61B 5/04842 600/544 |
| 2011/0256520 A1* | 10/2011 | Siefert | G09B 5/10 434/322 |
| 2012/0036004 A1* | 2/2012 | Pradeep | A61B 5/04842 705/14.41 |
| 2012/0108995 A1* | 5/2012 | Pradeep | A61B 5/0476 600/544 |
| 2013/0188054 A1* | 7/2013 | Weinblatt | H04N 7/18 348/159 |
| 2013/0235347 A1* | 9/2013 | Hennessey | G06F 3/013 351/210 |
| 2013/0325546 A1* | 12/2013 | Sorensen | G06Q 30/0201 705/7.29 |
| 2014/0002352 A1* | 1/2014 | Jacob | G06F 3/013 345/156 |
| 2014/0161316 A1* | 6/2014 | Golan | G06K 9/00261 382/103 |
| 2016/0036931 A1* | 2/2016 | Mathis | H04L 67/22 709/224 |

OTHER PUBLICATIONS

Augmented reality effectiveness in advertising P Connolly, C Chambers . . .—. . . Division of ASEE . . . , 2010—pdfs.semanticscholar.org (Year: 2010).*

Exploring the implications of virtual reality technology in tourism marketing: An integrated research framework YC Huang, KF Backman, SJ Backman . . .—. . . Journal of Tourism . . . , 2016—Wiley Online Library (Year: 2016).*

Eye-tracking product reconnnnenders' usage S Castagnos, N Jones, P Pu—. . . fourth ACM conference on Recommender . . . , 2010—dl.acm.org (Year: 2010).*

"Visual influence on in-store buying decisions: an eye-track experiment on the visual influence of packaging design" J Clement—Journal of marketing management, 2007—Taylor & Francis (Year: 2007).*

"Eye tracking and gaze vector calculation within immersive virtual environments" A Haffegee, V Alexandrov, R Barrow—. . . of the 2007 ACM symposium on . . . , 2007—dl.acm.org (Year: 2007).*

"Evaluation of pupil center-eye corner vector for gaze estimation using a web cam" L Sesma, A Villanueva, R Cabeza—. . . of the symposium on eye tracking . . . , 2012—dl.acm.org (Year: 2012).*

Adaptive image-space sampling for gaze-contingent real-time rendering M Stengel, S Grogorick, M Eisemann . . .—Computer Graphics . . . , 2016—Wiley Online Library (Year: 2016).*

"Kernel Density Estimation", retrieved from the web on Oct. 16, 2020. (Year: 2020).*

\* cited by examiner

VIEWED LOCATION METRIC GENERATION AND ENGAGEMENT ATTRIBUTION WITHIN AN AR OR VR ENVIRONMENT

BACKGROUND

Virtual and augmented reality environments have been developed to increase the richness of user interactions with a computing device. In augmented reality, the computing device employs digital experience content and virtual objects to augment a user's direct view of a physical environment in which the user is disposed. In other words, this direct view of the physical environment is not recreated as part of an augmented reality environment but rather the user actually "sees what is there." The virtual objects are then used to augment the user's view of this physical environment, such as to play a building game of virtual blocks on a physical table top. On the other hand, in virtual reality the computing device employs digital experience content to create a user's environment such that the physical environment is not viewable by the user. Accordingly, in virtual reality an entirety of the user's view is created virtually as part of the environment by the computing device.

Although digital experience content in both virtual and augmented reality environments has increased in the richness of user interactions, techniques and systems used by digital marketing systems to attribute user interaction with achieving an action have not adapted to the development of these virtual and augmented reality technologies. In a digital marketing content scenario, for instance, conventional digital marketer systems target digital marketing content (e.g., application notifications, banner ads) to particular customers based on which items of digital marketing content have been exposed to a customer and actions (e.g., "conversion" such as the purchase of a good or service or subscription to a mailing list) that resulted from this exposure. However, conventional digital marketing techniques are not adapted to the spatial realities of virtual and augmented reality spaces, thus requiring an alternate definition of user interactions than the traditional clicks and page views in order to operate in such environments.

SUMMARY

View location metric generation and engagement attribution within an AR or VR environment are described. In one example, metric data is generated to describe viewed locations within an augmented or virtual reality environment. The metric data is generated based on log data from at least one user device. The log data describes locations associated with an augmented or virtual reality environment and a viewing direction at corresponding locations. By incorporating viewing direction, user interactions through an AR or VR space can be visualized through use of the metric data in a way that reveals not only where a user went but what the user looked at along the way.

In another example, engagement attribution scores are generated that describe an amount of user interaction with corresponding virtual objects as part of an augmented or virtual reality environment. The engagement attribution scores, for instance, may be based on attributes of user interaction. Examples of attributes include an amount of time the digital marketing virtual object is viewed, an amount of time the digital marketing virtual object is in view but not focused upon, proximity to the digital marketing virtual object, an amount of time between an initial view of the digital marketing virtual object and movement toward the digital marketing virtual object, and a viewing angle associated with the digital marketing virtual object. Other examples include touching the digital marketing virtual object, destroying the digital marketing virtual object, causing the digital marketing virtual object to be saved in memory, commenting on the digital marketing virtual object, or responding to an offer associated with the digital marketing virtual object. Subsequent actions may also be taken into account, such as conversion. The engagement attribution scores quantify interaction with particular virtual objects and thus may be leveraged to quantify results of those interactions, such as conversion of a good or service as part of a digital marketing scenario.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
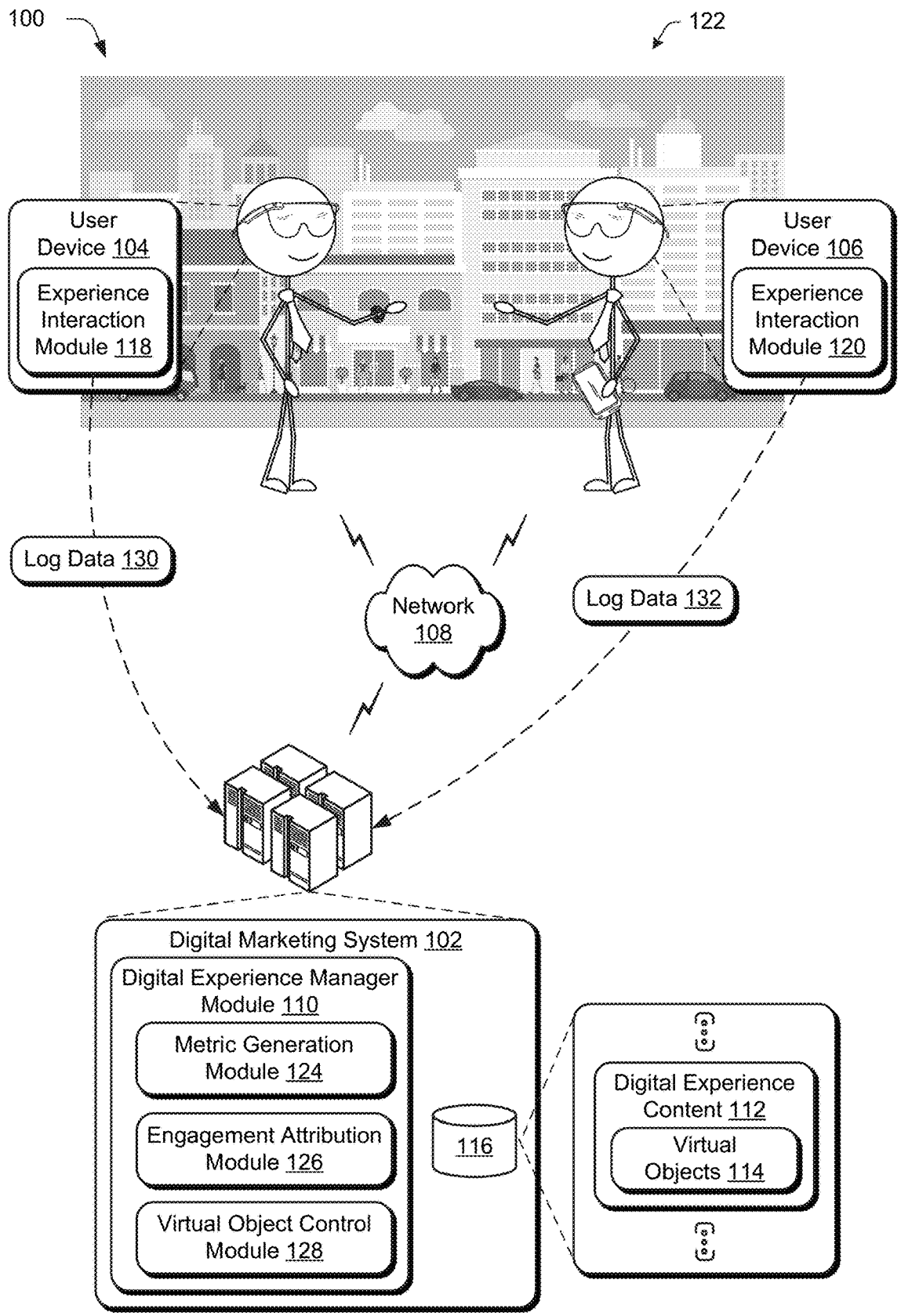
FIG. 1 is an illustration of an environment in an example implementation that is operable to employ viewed location metric generation and engagement attribution techniques described herein.

Digital experience content is used by a computing device to define an augmented or virtual reality environment that supports increased richness of user interaction. The user, for instance, may be exposed by the computing device to an immersive environment that supports an ability to see, hear, and manipulate virtual objects through rendering of the digital experience content. As a result, digital experience content increases the richness of visual, audio, and even tactile output to a user over conventional digital content output techniques, e.g., television, webpages, and so forth. However, conventional techniques used by digital marketing systems to provide targeted digital marketing content to users as part of these environments do not address this richness.

Accordingly, techniques and systems are described to generate metric data that is usable to describe location viewing within an AR or VR environment, which are referred to as "viewed locations" in the following. The metric data, for instance, may be configured as a map, a tabular format based on a number of particular locations, and so forth. The metric data is then used as a basis to control output of digital marketing virtual objects within the environment, e.g., at popular locations. In this way, a digital marketing system may gain insight into viewed locations within the environment and use this insight to control output of subsequent digital marketing virtual objects.

To generate the metric data, log data is collected by a metric generation module from a plurality of user devices. The log data describes locations (e.g., GPS coordinates) at which the user devices are located within the environment and corresponding viewing directions of the user devices at those locations, e.g., through sensors that indicate an orientation of the user device. The locations and corresponding viewing directions are usable by the metric generation module to generate metric data that describes the viewed locations. The metric data may then be used in a variety of ways, such as to plot vectors to describe the viewed locations within the environment as well as an amount of visibility of each of the locations. In this way, the metric data describes viewed locations within the environment in addition to recording locations at which the user device is located within the environment.

Two users, for instance, may interact with a virtual tourism application using respective user devices. As part of this interaction, both users may view a landmark from different locations within an AR or VR environment. By aggregating and analyzing the logged vectors, the metric data characterizes viewed locations within the environment and may thus describe that the landmark is being viewed even though both users do so in this instance from different locations within the environment. In this way, the a map visualizing the metric data provides additional insight and accuracy in describing user interaction within the environment.

Additionally, the metric data may also indicate an amount each location is viewed within the environment. For example, each vector generated as described above defines a viewed location within the AR or VR environment. Accordingly, a number of times vectors overlap each other also quantifies an amount each of viewed locations are viewed by the users, i.e., a "visibility" of the respective viewed locations within the environment. Thus, the metric data may define viewed locations of an AR or VR environment as well as an amount the locations are viewed, e.g., as a "heat map." Other techniques are also usable to determine visibility, such as kernel density estimation and convolution. The metric data may then be used to control output of subsequent virtual objects within the environment, such as to include digital marketing virtual objects at popular locations within the environment. In this way, the metric data may provide additional insight into both what locations (and corresponding virtual objects) are viewed by users within a virtual or augmented reality environment as well as how much those locations and objects are viewed.

Techniques and systems are also described to generate an engagement attribution score to quantify an amount of user interaction with particular virtual objects. This amount may then be used to determine an effectiveness of the virtual objects on performance of an action, e.g., interaction with digital marketing virtual object on conversion of a good or service.

In one example, log data is collected that describes user interaction with a digital marketing virtual object, e.g., a virtual shoe on a table top. The log data may describe a variety of different attributes of user interaction with the object, such as an amount of time the digital marketing virtual object is viewed, an amount of time the digital marketing virtual object is in view but not focused upon, proximity to the digital marketing virtual object, an amount of time between an initial view of the digital marketing virtual object and movement toward the digital marketing virtual object, a viewing angle associated with the digital marketing virtual object, and so forth. Each of these attributes may be assigned a weighting that is used by an engagement attribution module to generate an engagement attribution score for the virtual object.

The engagement attribution score thus quantifies an amount user engagement with the virtual object, which may give additional insight into an effect of that object on achieving a particular action, e.g., conversion. For example, a digital marketing system may configure a digital marketing virtual object as a virtual shoe. An engagement attribution score for the virtual shoe quantifies an amount of user interaction with the virtual shoe, e.g., based on whether the user viewed the shoe, handled the virtual shoe, and so forth. The score, along with data describing whether the user subsequently purchased a corresponding physical shoe, may thus be used to determine an effectiveness of the virtual shoe on achieving conversion. In this way, the engagement attribution score may address the richness of user interaction supported by augmented and virtual reality environments in determining effectiveness of digital marketing virtual objects. Further discussion of these and other examples is included in the following sections and shown in corresponding figures.

Term Examples

"Digital experience content" is used by a computing device to define an immersive environment as part of a virtual or augmented reality environment.

"Metric data" describes user interaction within the virtual or augmented reality environment as evaluated by functions applied to spatial or spatial and orientational coordinates that return real numbers. Examples include description of viewed locations and corresponding amounts of visibility of the viewed locations.

"Virtual objects" are content that is used to represent objects that are "not really there" as part of the virtual or augmented reality environment. Examples of virtual objects include augmentations, virtual human entities, stores, and so forth. "Digital marketing virtual objects" are virtual objects employed by a digital marketing system to promote conversion of a good or service.

A "viewed location" is a location that is likely viewed by a user of a user device as part of an augmented or virtual reality environment. This is contrasted with a "user location" that describes a location of the user device itself within the augmented or virtual reality environment. Thus, a viewed location may be visible from several different user locations.

"Attributes" refer to characteristics described in log data collected from user devices of user interaction with virtual objects. Examples of attributes include an amount of time the digital marketing virtual object is viewed, an amount of time the digital marketing virtual object is in view but not focused upon, proximity to the digital marketing virtual object, an amount of time between an initial view of the digital marketing virtual object and movement toward the digital marketing virtual object, and a viewing angle associated with the digital marketing virtual object. Other examples include touching the digital marketing virtual object, destroying the digital marketing virtual object, causing the digital marketing virtual object to be saved in memory, commenting on the digital marketing virtual object, or responding to an offer associated with the digital marketing virtual object. Subsequent actions may also be taken into account, such as conversion.

An "engagement attribution score" quantifies an amount of user engagement with a respective virtual object based on the attributes. Thus, the engagement attribution score may be used to address the richness of augmented and virtual reality environments to correlate user interactions with resulting actions, such as conversion.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 depicts an example digital medium environment 100 configured to support viewed location metric generation and engagement attribution techniques within an AR or VR environment. The digital medium environment 100 as illustrated in this example includes a digital marketing system 102 and user devices 104, 106 that are communicatively coupled, one to another, via a network 108. The digital marketing system 102 and user devices 104, 106 may be implemented using a variety of different types of computing devices in a variety of configurations.

A computing device, for instance, may be configured as a desktop computer, a laptop computer, a mobile device (e.g., assuming a handheld configuration such as a tablet or mobile phone), worn by a user as goggles or other eyewear, and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown by way of example, the computing device may be representative of a plurality of different devices, such as multiple servers utilized by a business to perform operations "over the cloud" as shown for the digital marketing system 102 and described in FIG. 9.

The digital marketing system 102 is further illustrated as including a digital experience manager module 110. The digital experience manager module 110 is implemented at least partially in hardware of at least one computing device (e.g., a processing system and computer-readable storage medium) to manage generation, storage, and provision of digital experience content 112 and associated virtual objects 114. The digital experience content 112 and associated virtual objects 114 are illustrated as stored in storage 116, e.g., a computer-readable storage media, database system, and so forth. The user devices 104, 106, for instance, may receive the digital experience content 112 and render it using respective experience interaction modules 118, 120 for viewing by a user, a rendered example 122 of which is illustrated as a street scene of a city. Users associated with the user devices 104, 106 may then interact with the rendered example 122, e.g., to view, listen to, navigate between, and even manipulate virtual objects 114. Thus, augmented and virtual reality environments provide an immersive experience to a user of the computing device 102.

Although the immersion supported as part of augmented or virtual reality environments may greatly expand a richness of user interaction with the user devices 104, 106, this richness may also introduce complications in attributing user actions with corresponding virtual objects 114. Immersion as part of an augmented or virtual reality environment, for instance, may support a 360-degree view of an environment having numerous virtual objects in a virtual or augmented reality environment and even actual physical objects in an augmented reality environment. Thus, a user, even when remaining at a single location within one of these environments may be exposed to a multitude of virtual objects. Therefore, it may make it difficult to attribute an action such as conversion to particular virtual objects within the environment. Conventional techniques employed by mobile phones, desktop computers, and so on are not confronted with this challenge due to limitations of display and other outputs employed. A user, for instance, may view a banner ad on a webpage using a mobile phone and thus has a likelihood of at least viewing the ad as the user is provided within limited ability to do otherwise. On the other hand, a virtual billboard in a virtual or augmented reality environment may be ignored by a user due to the richness and immersion supported by AR and VR environments.

Accordingly, the digital experience manager module 110 in this example includes a metric generation module 124, an engagement attribution module 126, and a virtual object control module 128. The metric generation module 124 is configured in this example to generate metric data describing viewed locations associated with the digital experience content 112. Thus, metric data describes what is actually viewed by the users and respective user devices, which may be in addition to where the user and corresponding user device was located within the environment.

To do so, the metric generation module 124 obtains log data 130, 132 from the user devices 104, 106 that describe locations and corresponding viewed directions. From this log data 130, 132, the metric generation module 124 generates metric data to describe the viewed locations within the environment and may also describe an amount (i.e., visibility) the locations are viewed. The metric data may then be used to control output of virtual objects 114 within the environment by the virtual object control module 128, e.g., to output digital marketing virtual objects at popular locations within the environment. Further discussion of this and other examples of view location metric generation is described in greater detail a corresponding section in the following discussion and shown in relation to FIGS. 3-6.

In another example, an engagement attribution module 126 is employed to attribute user interaction with virtual objects 114 (or even physical objects in an AR scenario) on achieving an action, e.g., conversion of a good or service. The engagement attribution module 126, for instance, may also collect log data 130, 132 from the user devices 104, 106. The log data 130, 132 may describe a variety of different attributes of user interaction with the object, such as an amount of time the digital marketing virtual object is viewed, an amount of time the digital marketing virtual object is in view but not focused upon, proximity to the digital marketing virtual object, an amount of time between an initial view of the digital marketing virtual object and movement toward the digital marketing virtual object, a viewing angle associated with the digital marketing virtual object, and so forth.

Each of these attributes may be assigned a weighting that is used by an engagement attribution module to generate an engagement attribution score for the virtual object. In this way, the engagement attribution score describes an amount of user interaction exhibited with respective virtual objects 114. The amount of user interaction may then be correlated with performance of subsequent actions (e.g., purchase of a good or service related to the objects) to determine an effectiveness of the objects on achieving the result. In this way, the engagement attribution module 126 may address the richness of user interaction supported by virtual and augmented reality environments, further discussion of which is included in a corresponding section and shown in corresponding FIGS. 7-8.

Figure 2:
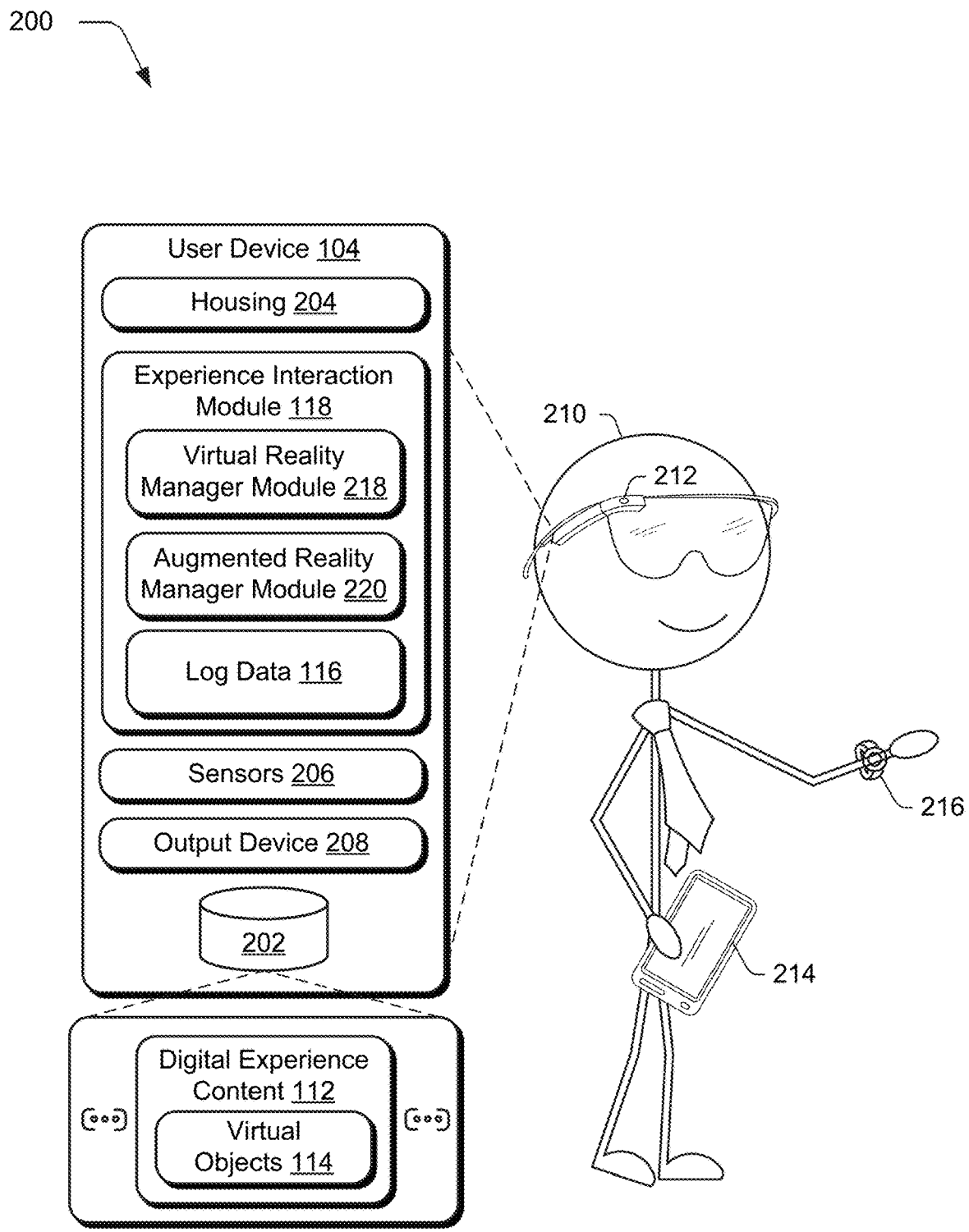
FIG. 2 is an illustration of a digital medium environment in an example implementation showing a computing device of FIG. 1 in greater detail as configured for rendering of a virtual or augmented reality environment.

FIG. 2 is an illustration of a digital medium environment 200 in an example implementation showing the user device 104 of FIG. 1 in greater detail. The illustrated environment 100 includes the user device 104 of FIG. 1 as configured for use in augmented reality and/or virtual reality scenarios, which may be configured in a variety of ways.

Figure 9:
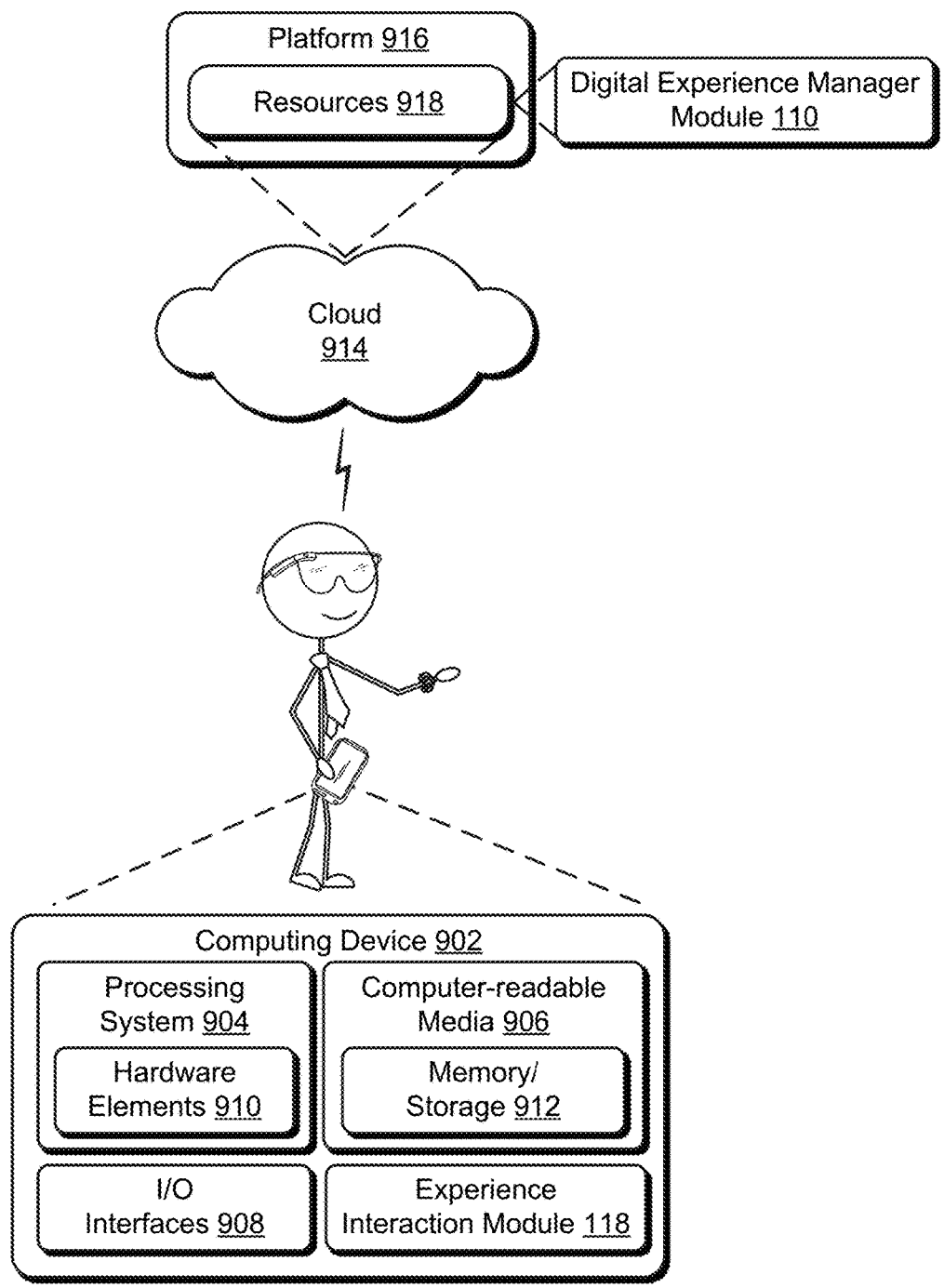
FIG. 9 illustrates an example system including various components of an example device that can be implemented as any type of computing device as described and/or utilize with reference to FIGS. 1-8 to implement embodiments of the techniques described herein.

The user device 104 is illustrated as including the experience interaction module 118 that is implemented at least partially in hardware of the user device 104, e.g., a processing system and memory of the computing device as further described in relation to FIG. 9. The experience interaction module 118 is configured to manage rendering of and user interaction with digital experience content 112 and corresponding virtual objects 114. The digital experience content 112 is illustrated as maintained in storage 202 of the user device 104.

The user device 104 includes a housing 204, one or more sensors 206, and an output device 208, e.g., display device, speakers, and so forth. The housing 204 is configurable in a variety of ways to support user interaction as part of the digital experience content 112, i.e., an augmented or virtual reality environment defined by the content. In one example, the housing 204 is configured to be worn on the head of a user 210 (i.e., is "head mounted" 212), such as through configuration as goggles, glasses, contact lens, and so forth. In another example, the housing 204 assumes a hand-held 214 form factor, such as a mobile phone, tablet, portable gaming device, and so on. In yet another example, the housing 204 assumes a wearable 216 form factor that is configured to be worn by the user 210, such as a watch, broach, pendant, or ring. Other configurations are also contemplated, such as configurations in which the user device 104 is disposed in a physical environment apart from the user 210, e.g., as a "smart mirror," wall-mounted projector, television, and so on.

The sensors 206 may also be configured in a variety of ways to detect a variety of different conditions. In one example, the sensors 206 are configured to detect an orientation of the user device 104 in three-dimensional space, such as through use of accelerometers, magnetometers, inertial devices, radar devices, and so forth. In this way, the sensors 206 may detect an orientation of the user device 104 and thus a viewing direction of the user device 104 within an augmented or virtual reality environment.

In another example, the sensors 206 are configured to detect environmental conditions of a physical environment in which the user device 104 is disposed, such as objects, distances to the objects, motion, colors, and so forth. A variety of sensor configurations may be used, such as cameras, radar devices, light detection sensors (e.g., IR and UV sensors), time of flight cameras, structured light grid arrays, barometric pressure, altimeters, temperature gauges, compasses, geographic positioning systems (e.g., GPS), and so forth. In a further example, the sensors 206 are configured to detect environmental conditions involving the user 210, e.g., heart rate, temperature, movement, and other biometrics.

The output device 208 is also configurable in a variety of ways to support a virtual or augmented reality environment through visual, audio, and even tactile outputs. Examples of which include a typical display device found on a mobile device such as a camera or tablet computer, a light field display for use on a head mounted display in which a user may see through portions of the display, stereoscopic displays, projectors, television (e.g., a series of curved screens arranged in a semicircular fashion), and so forth. Other configurations of the output device 208 may also be included as part of the user device 104, including devices configured to provide user feedback such as haptic responses, audio sounds, and so forth.

The housing 204, sensors 206, and output device 208 are also configurable to support different types of user experiences by the experience interaction module 116. In one example, a virtual reality manager module 218 is employed to support virtual reality. In virtual reality, a user is exposed to an immersive environment, the viewable portions of which are entirely generated by the user device 104. In other words, everything that is seen and heard by the user 210 is rendered and displayed by the output device 118 (e.g., visual and sound) through use of the virtual reality manager module 218 by rendering the digital experience content 110.

The user 210, for instance, may be exposed to virtual objects 112 that are not "really there" (e.g., virtual bricks) and are displayed for viewing by the user in an environment that also is completely computer generated. The computer-generated environment may also include representations of physical objects included in a physical environment of the user 210, e.g., a virtual table that is rendered for viewing by the user 210 to mimic an actual physical table in the environment detected using the sensors 206. On this virtual table, the virtual reality manager module 218 may also dispose virtual objects that are not physically located in the physical environment of the user 210, e.g., the virtual bricks as part of a virtual playset. In this way, although an entirely of the display being presented to the user 210 is computer generated, the virtual reality manager module 218 may represent physical objects as well as virtual objects within the display.

The experience interaction module 118 is also illustrated as supporting an augmented reality manager module 220. In augmented reality, the digital experience content 110 is used to augment a direct view of a physical environment of the user 210. The augmented reality manger module 220, for instance, may detect landmarks of the physical table disposed in the physical environment of the user device 104 through use of the sensors 206, e.g., object recognition. Based on these landmarks, the augmented reality manager module 220 configures the virtual objects 114 to be viewed within this environment.

The user 210, for instance, may view the actual physical environment through head-mounted 212 goggles. The head-mounted 212 goggles do not recreate portions of the physical environment as virtual representations as in the VR scenario above, but rather permit the user 210 to directly view the physical environment without recreating the environment. The virtual objects 114 are then displayed by the output device 208 to appear as disposed within this physical environment. Thus, in augmented reality the virtual objects 114 augment what is "actually seen and heard" by the user 210 in the physical environment. In the following discussion, the digital experience content 112 and included virtual objects 114 may be rendered by the experience interaction module 116 in both a virtual reality scenario and an augmented reality scenario.

The experience interaction module 116 is also illustrated as generating log data 116. The log data 116 is generated using sensors 206 of the user device 104 to describe a variety of attributes. In one example, the log data 116 includes location data that describes a location associated the user device 104 as part of interaction with the digital experience content 112. In an augmented reality scenario, for instance, the location data may describe a physical location in a physical environment, e.g., through use of GPS coordinates, cellular triangulation, and so forth. In a virtual reality scenario, the location data may describe a virtual location within an environment, e.g., grid coordinates. Thus, the location data describes "where" the user device 104 is located in relation to these environments.

Direction data may also be generated by the sensors 206 to indicate a viewing direction, i.e., "where" the user device 104 is pointed to view the environments. Thus, a combination of where the device is located in relation to an environment and the viewing direction may be used to generate metric data that describes viewed locations within the environment as further described in relation to FIGS. 3-6.

In another example, the log data 116 describes attributes involving user interaction with the virtual objects 114. Example of attributes include time spent viewing the virtual object 114, how quickly a user 210 moved to get closer to the virtual object 114, subsequent actions as part of the user interaction (e.g., touching, picking up, saving the object), and so forth. The log data 116 may then be used as a basis to generate an engagement attribution score that is usable to quantify an amount of user interaction with respective virtual objects 114. As a result, these scores may be used as a basis to address the richness of user interaction supported by augmented and virtual reality environments and determine possible effects of those interactions.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Viewed Location Metric Generation of an AR or VR Environment

Figure 3:
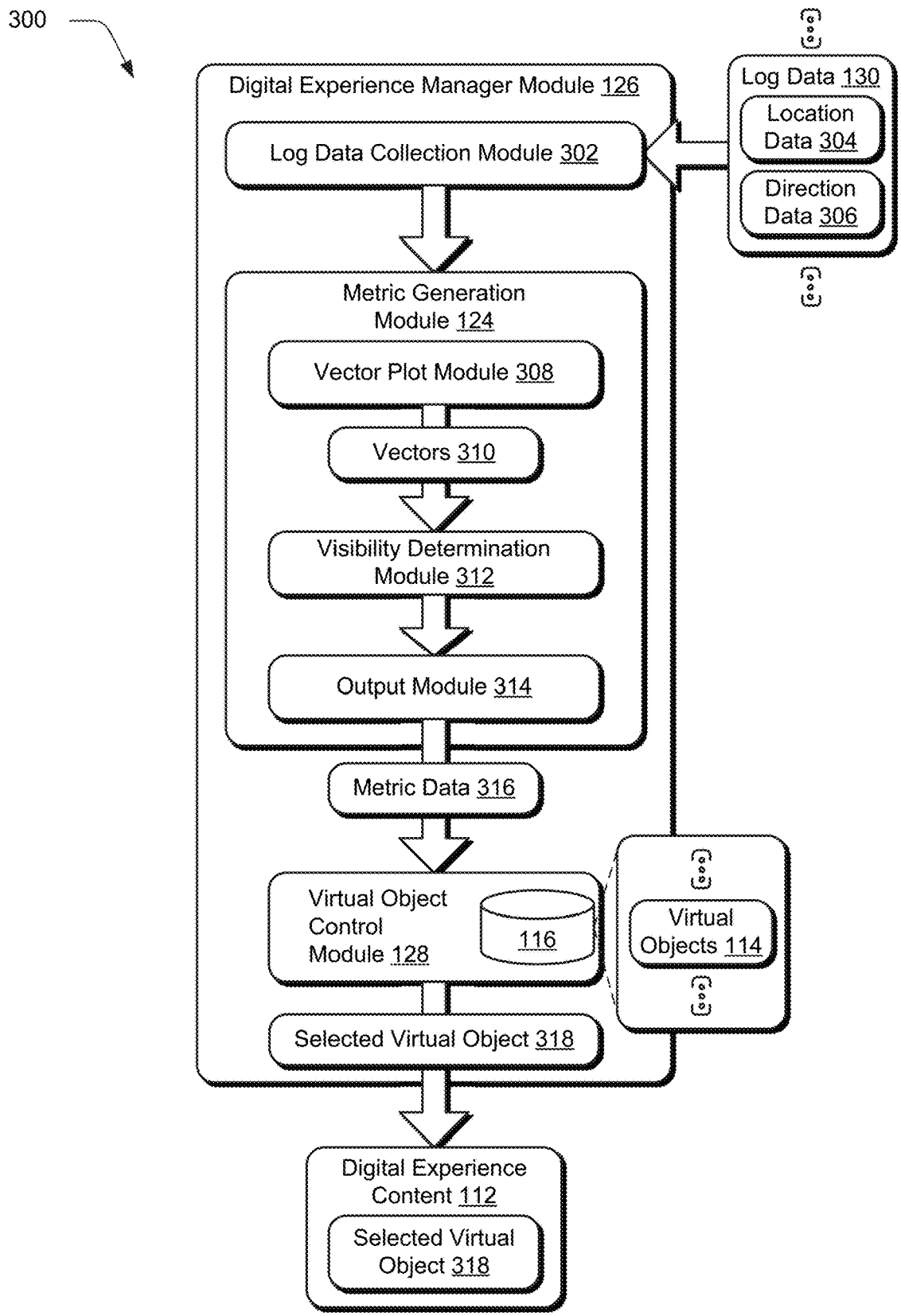
FIG. 3 depicts an example implementation of generation of a metric data describing viewed locations associated with an augmented or virtual reality environment and use of the metric data to control output of subsequent virtual objects.
Figure 4:
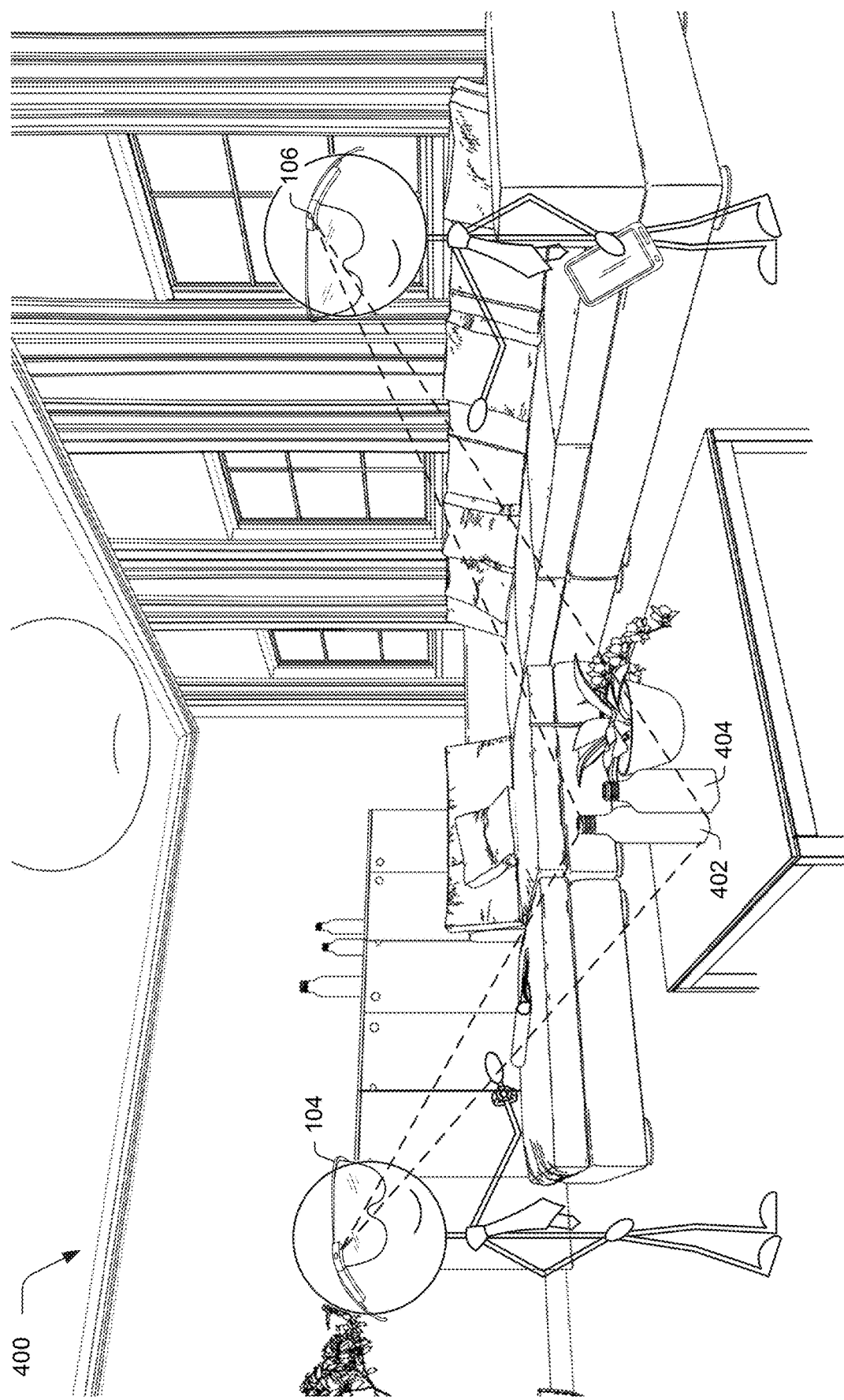
FIG. 4 depicts an example implementation of generation of log data used to generate metric data describing viewed locations associated with an augmented or virtual reality environment.
Figure 5A:
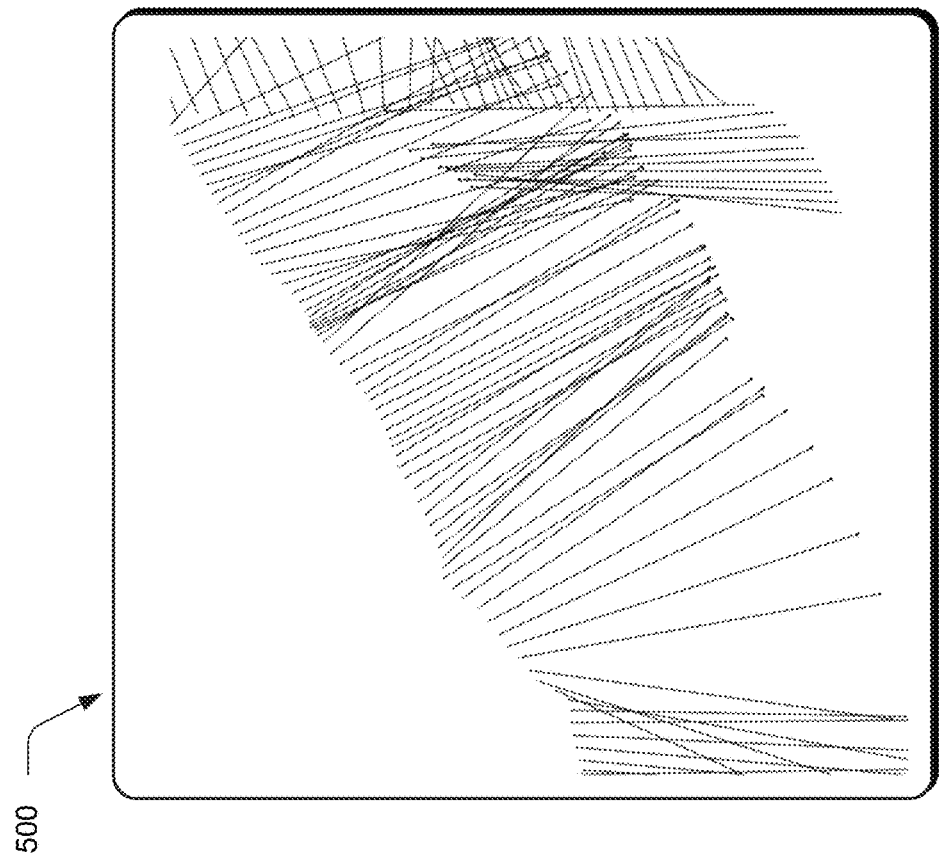
FIG. 5A depicts an example implementation of plotting of vectors to visualize metric data to characterize viewed locations.
Figure 5B:
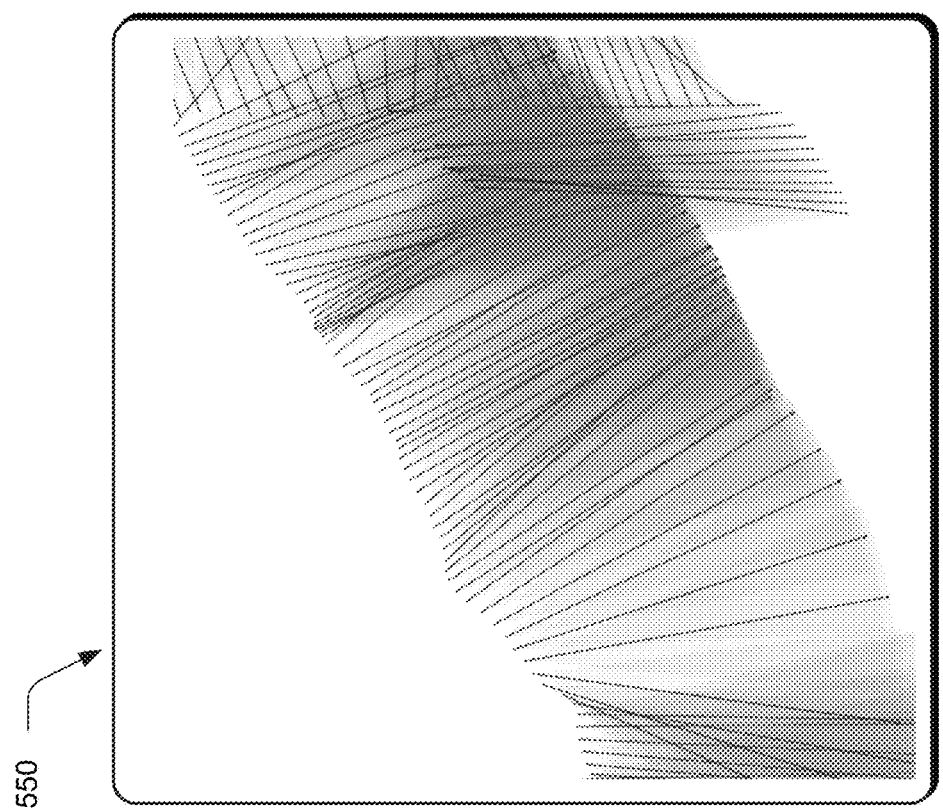
FIG. 5B depicts an example implementation showing vector overlap as specifying an amount the viewed locations are viewed.
Figure 6:
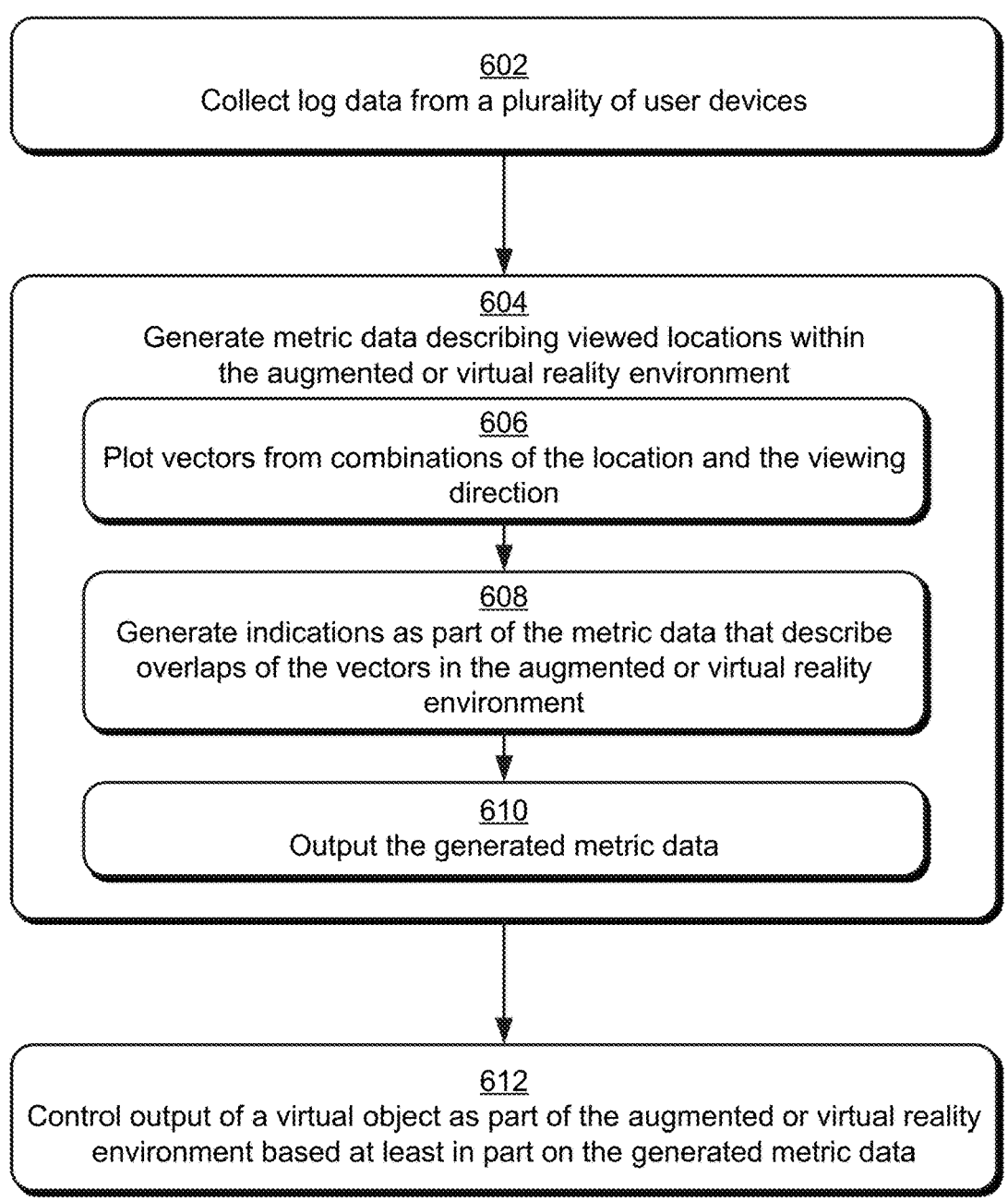
FIG. 6 is a flow diagram depicting a procedure in an example implementation in which metric data is generated as describing viewed locations associated with an augmented or virtual reality environment and use of the metric data to control output of subsequent virtual objects.

FIG. 3 depicts an example implementation 300 of metric data generation describing viewed locations associated with an augmented or virtual reality environment and use of the metric data to control output of subsequent virtual objects. FIG. 4 depicts an example implementation 400 of generation of log data used to generate metric data describing viewed locations associated with an augmented or virtual reality environment. FIG. 5A depicts an example implementation 500 of plotting of vectors as part of metric data to describe viewed locations. FIG. 5B depicts an example implementation 550 that uses image rasterization to measure vector overlap to approximate an amount the viewed locations are viewed. FIG. 6 depicts a procedure 600 in an example implementation in which metric data is generated as describing viewed locations associated with an augmented or virtual reality environment and use of the metric data to control output of subsequent virtual objects.

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 3-6.

To begin, log data is collected from a plurality of user devices (block 602). A log data collection module 302, for instance, may collect log data 130 from the user device 104 as well as user device 106. The log data 130 in this example includes location data 304 that describes a location associated with an augmented or virtual reality environment. In an augmented reality environment, for instance, sensors 206 of the user device 104 may provide physical coordinates within the "real world," e.g., GPS coordinates, a result of triangulation using communication towers, and so forth. In a virtual reality environment, the location data 304 may describe grid coordinates.

The log data 130 also includes direction data 306 that indicates a corresponding view direction of the user device 104 at the described location. The sensors 206, for instance, may be configured to determine orientation of the user device 104 in two dimensional or three dimensional space and from this describe "where the user device 104 is facing." Other examples are also contemplated, such as to include a timestamp such that a change in viewed locations may be viewed over time.

Log data 130 may assume a variety of configuration, an example of which is as follows:

```
log = [
    {
        "timestamp": 1469139079527,
        "latitude": 40.43504538,
        "longitude": -111.89191901,
        "azimuth": 275
    },
    {
```

```
            "timestamp": 1469139079528,
            "latitude": 40.43461911,
            "longitude": -111.89159904,
            "azimuth": 283
        },
        ...
]
```

Metric data 316 is generated from the log data 130 by the metric generation module 124 that describes viewed locations within the augmented or virtual reality environment (block 604). The metric generation module 124, for instance, may be configured to convert the location data and direction data 306 of the log data 130 into metric data 316 that describes "what" is being viewed. This may be performed in a variety of ways. In one example, a vector plot module 308 is used to plot vectors 310 from combinations of the location and the viewing direction (block 606). The location data 304, for instance, indicates a starting location at which a respective user device 104 is positioned and the direction data 306 indicates a direction in relation to this position which defines the vectors 310. These vectors may then be plotted as shown in the example implementation 500 of FIG. 5A to indicate viewed locations within the associated augmented or virtual reality environment and thus which locations were visible via respective user devices.

The vectors 310 may also be used to indicate an amount each of the viewed locations are viewed using respective user devices 104, 106. For example, a visibility determination module 312 may be configured to generate indications as part of the metric data that describe visibility of locations in the augmented or virtual reality environment (block 608). As shown in the example implementation 550 of FIG. 5B, for instance, indications involving an intensity/amount of color are used to describe corresponding amounts of overlap of shapes associated with vectors and thus different amounts of viewing of the viewed locations. This is accomplished by defining a shape corresponding to each vector, where the shape has a certain opacity, then rasterizing the layered shapes to produce an image. Thus, these indications may be used to generate a heat map as part of the metric data 316 to describe different amounts of visibility of the corresponding viewed locations to users of the user devices 104, 106.

More generally, a variety of metric calculation techniques are contemplated, including kernel density estimation, convolution, and so forth. In general, metric data is determined as a function of spatial and/or orientational coordinates that returns real numbers. Formally expressed, spatial metrics correspond to the function $f(\vec{x}) \rightarrow \mathbb{R}$ where $\vec{x}$ is a vector of any number of spatial dimensions (e.g. two for two-dimensional, three for three-dimensional spaces). Metrics of space and orientation together can be expressed formally as functions $f(\vec{x}, \vec{\theta}) \rightarrow \mathbb{R}$ where $\vec{x}$ is a vector of the spatial dimensions and $\vec{\theta}$ represents the user's orientation. These can be further decomposed as sums of kernel functions of the various logged vectors. Thus $f(\vec{x}) = \Sigma_{i=0}^{N} K(\vec{x}_i)$ and $f(\vec{x}, \vec{\theta}) = \Sigma_{i=0}^{N} K(\vec{x}_i, \vec{\theta}_i)$ where $\vec{x}_i$ represents the ith logged vector's spatial component, and $\vec{\theta}_i$ represents the ith logged vector's orientational component. For purposes of analysis of AR/VR log data, there are two tasks: (1) evaluate the metric at any given location in the environment; and (2) find locations that maximize or minimize the metric. The first task is a matter of straightforward mathematical evaluation. The second is a matter of optimization, and all existing methods for numerical optimization can be brought to bear. Taking care in the definition of the metrics—such as by selecting differentiable functions, or differentiable kernel functions in the decomposed formulation above—can make optimization through hill-climbing and related methods particularly efficient. When differentiable functions are not suitable and other continuous approximation methods are found inadequate, each logged vector can be represented as a vector shape and collectively rasterized onto a matrix representing the space in question. In this case the metric functions are implemented by returning the value at the grid point closest to the spatial and/or orientational dimensions provided, and points that maximize or minimize the metric can be found by inspect every point on the grid individually. It may prove desirable to first modify the grid values by applying any number of image processing techniques, including convolution. For example, the impact of an individual vector shape on the metric values in its vicinity could be broadened by application of a blurring convolution kernel.

The generated metric data 316 is then output (block 610) by an output module 314, e.g., for display in a user interface, stored in memory, and so forth.

In this way, the metric data 316 describes what is viewed by users as part of an augmented or virtual reality environment and is not limited to describing user locations within the environment. As a result, the metric data 316 has increased accuracy in describing actual user interaction as part of a virtual or augmented reality environment. As shown in FIG. 4, for instance, first and second users of respective user devices 104, 106 are disposed at different locations within a virtual or augmented reality environment. However, both user devices 104, 106 are looking towards the same viewed location within the environment, which includes a virtual object 402 configured as a bottle.

The visibility of this viewed location may then serve as a basis for the virtual object control module 128 to select a virtual object 318 from a plurality of virtual objects 114 for inclusion as part of the digital experience content 112 (block 612), e.g., a virtual bottle 404 of a competing beverage, based at least in part on the metric data 316. Visibility may also be determined by the metric generation module 124 in a variety of other ways, such as a grid search, hill-climbing technique, and so forth and may be performed for two or three dimensions.

Viewed locations as described above refer to the locations that are viewed through use of user devices as part of an augmented or virtual reality environment. The metric data 316 may also be used to describe how those viewed locations are typically viewed, i.e., "views" as defined by a location and viewing angle. This may be determined using techniques similar to those described above by incorporating a viewing angle as an additional dimension alongside the spatial dimensions.

Additionally, as previously described conventional analytics address a one dimensional space (e.g., web pages or URLs) in which a binary condition is employed to indicate whether the content is exposed or not exposed to the user and a corresponding result. Through use of the metric data 316 described herein, however, a rich description may be obtained that addresses the richness of user interaction with the AR or VR environment. This may be used to calculate metrics across an entire space and search for patterns that may be of interest, e.g., resulting in conversion. Examples of such metrics include location visibility, total users in a defined vicinity, man/max/average simultaneous users in the vicinity, application-dependent event counts, and so on. Other output techniques by the output module 314 include automatically detect viewed locations that have a threshold amount of visibility and reporting on those, such as through use of a heat map or continuous visualization that may change over time by leveraging the timestamps to show changes in user behavior.

Engagement Attribution as Part of an AR or VR Environment

Figure 7:
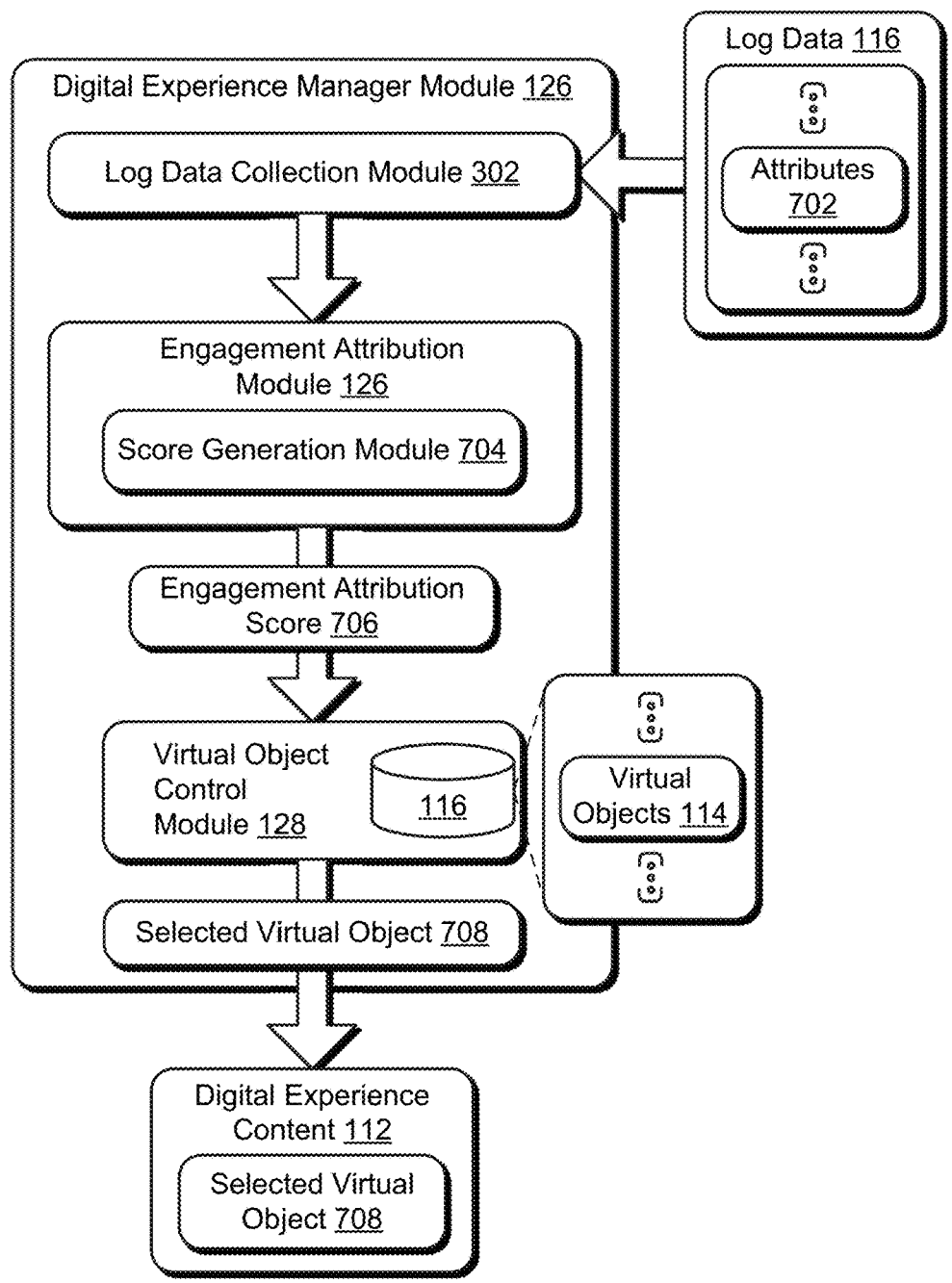
FIG. 7 depicts system in example implementation attributing engagement to virtual objects as part of an AR or VR environment.
Figure 8:
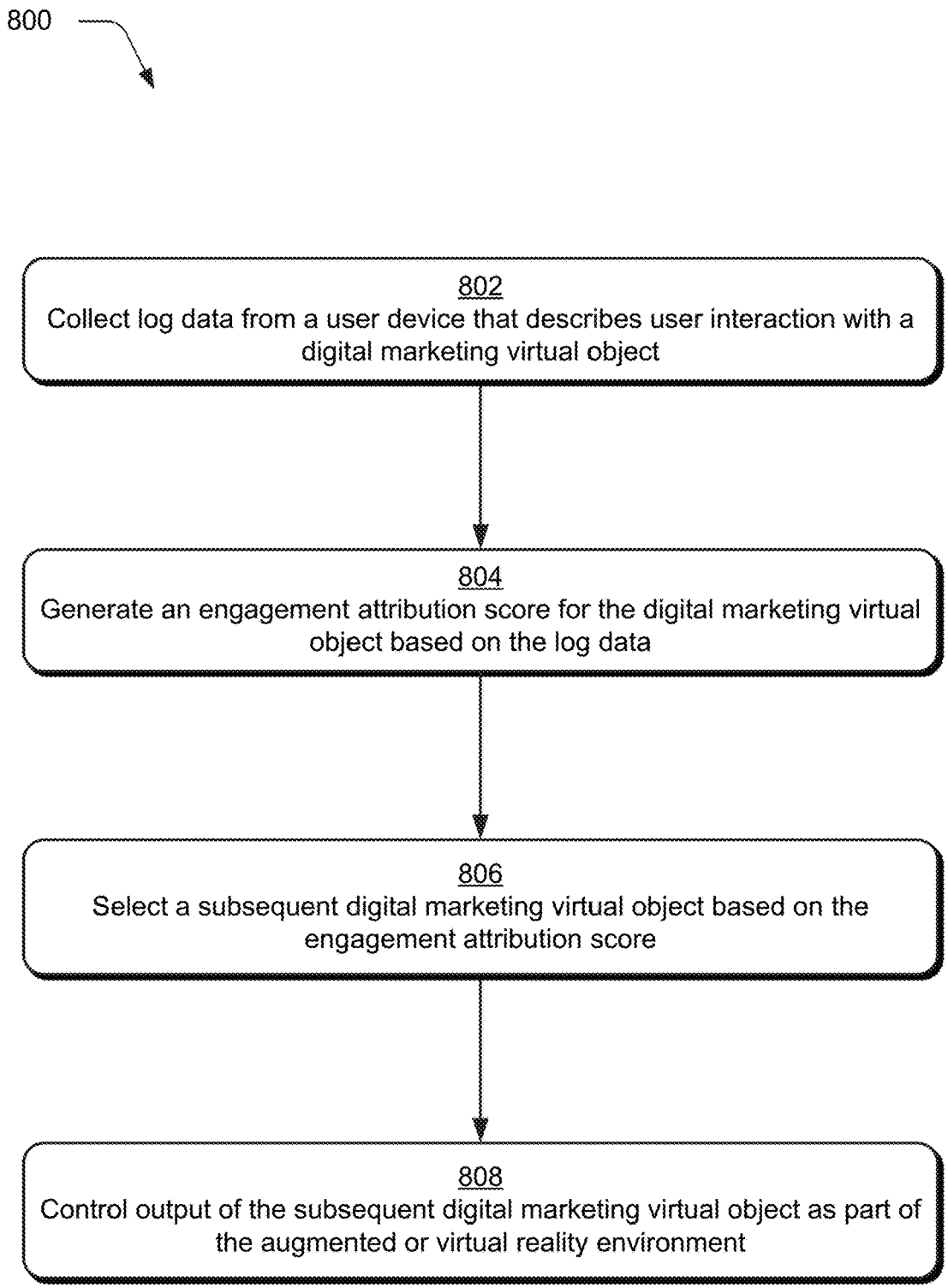
FIG. 8 is a flow diagram depicting a procedure in an example implementation in which an engagement attribution score is generated for digital marketing virtual object and used to control output of a subsequent digital marketing virtual object.

FIG. 7 depicts system 700 in example implementation attributing engagement to virtual objects as part of an AR or VR environment. FIG. 8 depicts a procedure 800 in an example implementation in which an engagement attribution score is generated for digital marketing virtual object and used to control output of a subsequent digital marketing virtual object.

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 7-8.

Augmented and virtual reality environments support immersive environments that allow for increased user engagement as contrasted with web environments, e.g., web pages. As a result, AR and VR environments support an increased ability to include digital marketing virtual objects, such as virtual goods, signs, billboards, audio notifications, and so forth. However, measuring the effectiveness of these may have increased difficulty due to this richness, e.g., a user may be exposed to multiple virtual objects even at a single location within an AR or VR environment.

Accordingly, in this example log data 116 is also collected by the log data collection module 302 from a user device that describes user interaction with a digital marketing virtual object (block 802) and attributes 702 of that interaction. The log data 116 is then processed by an engagement attribution module 126, and more particularly a score generation module 704 to generate an engagement attribution score 706 for the digital marketing virtual object based on the log data (block 804). The engagement attribution score 706 is indicative of an amount of user interaction that is associated with the digital marketing virtual object. As such, the engagement attribution score may be based on a variety of different attributes 702 of user interaction.

Examples of attributes 702 include an amount of time the digital marketing virtual object is viewed, an amount of time the digital marketing virtual object is in view but not focused upon, proximity to the digital marketing virtual object, an amount of time between an initial view of the digital marketing virtual object and movement toward the digital marketing virtual object, and a viewing angle associated with the digital marketing virtual object. Other examples include touching the digital marketing virtual object, destroying the digital marketing virtual object, causing the digital marketing virtual object to be saved in memory, commenting on the digital marketing virtual object, or responding to an offer associated with the digital marketing virtual object. Subsequent actions may also be taken into account, such as conversion.

The score generation module 704 may then employ a weighting for each of these attributes in generating a final engagement attribution score 706 for a corresponding digital marketing virtual object, an example of which is described as follows:

(weighted_interaction_score*interaction_score_weight)+
 (weighted_subsequent_action_score*subsequent_action_score_weight)
 /baseline_interaction_average.

For example, suppose a user walking in a virtual room that includes a digital marketing virtual object 402 as a bottle as shown in FIG. 4. The user interacts with the virtual object and the following data is recorded as log data 116 by the user device 104:

```
{
    objectId: 49298434,
    timeSpentFocusing: 3.5    /*seconds */
     timeSpentInViewNotFocusing: 6,     /*seconds*/
    proximity: 84,    /*inches*/
    velocity: 10,   /*inches per second*/
    angles: [67,82]    /*degrees*/
}
```

Each of these attributes 702 is given a 20% weighting (0.2) in this example, and based on each performance range (e.g., for proximity [200-2] where 200 would gain a 0.01 score and 2 would gain a 1.0 score), the combined engagement attribution score 706 for this user interaction is 0.58. If a subsequent action was given a score of 0.2, the baseline interaction average for this user is 0.4. If equal weighting is given to both interaction and subsequent actions, the formula could be computed as "(0.58*0.5)+(0.2*0.5)/0.4=0.975." These score could then be viewed on a per digital marketing virtual object basis to compare a return on investment for each one. This may then be used as a basis to select a subsequent digital marketing virtual object based on the engagement attribution score (block 806) and control of output of the object (block 808).

Other examples are also contemplated, such as experience-enhancing behaviors based on focus action, e.g., auto zoom based on the engagement attribution score 706. For example, a user may walk around a VR environment as before. However, if the user stops with a virtual object centered in a viewport for a threshold amount of time (e.g., two seconds), the digital experience manager module 126 may automatically zoom in and provide details.

Example System and Device

FIG. 9 illustrates an example system generally at 900 that includes an example computing device 902 that is representative of one or more computing systems and/or devices that may implement the various techniques described herein. This is illustrated through inclusion of the experience interaction module 110 and the digital experience manager module 118. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to attribute user interaction with a first digital virtual object to control output of a second digital virtual object, a method implemented by at least one computing device, the method comprising:
   receiving, by the at least one computing device, log data from a computing device, the log data describing a plurality of locations and a respective plurality of viewing directions as part of an augmented or virtual reality environment;
   generating, by the at least one computing device, vectors from combinations of the plurality of locations and respective plurality of viewing directions from the log data;
   defining, by the at least one computing device, a plurality of shapes, each said shape corresponding to a respective said vector;
   determining, by the at least one computing device, amounts of visibility of respective locations within the augmented or virtual reality environment based on overlap of the shapes at the respective locations as defining the amounts of visibility at the respective locations;
   generating, by the at least one computing device, an engagement attribution score for the first virtual object based on the determined amount of visibility at a respective said location of the first virtual object;
   selecting, by the at least one computing device, the second virtual object from a plurality of virtual objects based on the engagement attribution score of the first digital virtual object; and
   controlling, by the at least one computing device, output of the second virtual object.

2. The method as described in claim 1, wherein the log data describes a plurality of attributes of the user interaction with the first digital virtual object and the generating of the engagement attribution score includes applying a weighting differently to the plurality of attributes.

3. The method as described in claim 2, wherein the plurality of attributes includes:
   an amount of time the first virtual object is viewed;
   an amount of time the first virtual object is in view but not focused upon;
   proximity to the first virtual object;
   an amount of time between an initial view of the first virtual object and movement toward the first virtual object; or
   a viewing angle associated with the first virtual object.

4. The method as described in claim 2, wherein the plurality of attributes includes:
   touching the first virtual object;
   destroying the first virtual object;
   causing the first virtual object to be saved in memory;
   commenting on the first virtual object; or
   responding to an offer associated with the first virtual object.

5. The method as described in claim 1, wherein the log data describes an action performed subsequent to the user interaction with the first virtual object.

6. In a digital medium environment to attribute user interaction with a first virtual object to control output of a second virtual object, system comprising a processing system and computer readable storage medium as implementing:
   means for receiving log data from a computing device, the log data describing a plurality of locations and a respective plurality of viewing directions as part of an augmented or virtual reality environment;
   means for generating a plurality of vectors from combinations of the plurality of locations and respective plurality of viewing directions;
   means for defining a plurality of shapes, each said shape corresponding to a respective said vector;
   means for determining amounts of visibility of respective locations within the augmented or virtual reality environment based on overlap of the shapes at the respective locations as defining the amounts of visibility at the respective locations;
   means for generating an engagement attribution score for the first virtual object based on the determined amount of visibility at a respective said location of the first virtual object;
   means for selecting the second virtual object from a plurality of virtual objects based on the engagement attribution score of the first virtual object; and
   means for controlling output of the second virtual object as part of the augmented or virtual reality environment.

7. The system as described in claim 6, wherein the log data describes a plurality of attributes of the user interaction with the first virtual object and the generating means includes means for applying a weighting, differently, to the plurality of attributes.

8. The system as described in claim 7, wherein the plurality of attributes includes:
   an amount of time the first virtual object is viewed;
   an amount of time the first virtual object is in view but not focused upon;
   proximity to the first virtual object;

an amount of time between an initial view of the first virtual object and movement toward the first virtual object;

a viewing angle associated with the first virtual object;

touching the first virtual object;

destroying the first virtual object;

causing the first virtual object to be saved in memory;

commenting on the first virtual object; or responding to an offer associated with the first virtual object.

9. The system as described in claim 6, wherein the log data describes an action performed subsequent to the user interaction with the first virtual object.

10. In a digital medium environment to attribute user interaction with a first digital virtual object to control output of a second digital virtual object, a method implemented by at least one computing device, the method comprising:

receiving, by the at least one computing device, log data from a computing device, the log data describing a plurality of attributes of user interaction with the virtual object;

generating, by the at least one computing device, vectors from combinations of a viewing direction at a corresponding location from the log data;

defining, by the at least one computing device, a plurality of shapes, each said shape corresponding to a respective said vector;

generating, by the at least one computing device, a heat map describing amounts of visibility of locations within the augmented or virtual reality environment based on overlap of the shapes as defining the amounts of visibility at the location;

generating, by the at least one computing device, an engagement attribution score for the first virtual object based on the heat map;

selecting, by the at least one computing device, the second virtual object from a plurality of virtual objects based on the engagement attribution score of the first virtual object; and controlling, by the at least one computing device, output of the second virtual object.

11. The method as described in claim 10, wherein the plurality of shapes have respective opacities and the generating of the heat map includes rasterizing of the plurality of shapes, opacity of which defines the amounts of visibility of the locations within the augmented or virtual reality environment.

12. The method as described in claim 10, wherein the plurality of attributes include proximity to the first virtual object or an amount of time the first object is in view but not focused upon.

13. The method as described in claim 10, wherein the plurality of attributes includes an amount of time between an initial view of the first virtual object and movement toward the first virtual object.

14. The method as described in claim 10, wherein the plurality of attributes includes a viewing angle associated with the first virtual object from another location within the virtual reality environment.

15. The method as described in claim 10, wherein the plurality of attributes includes data describing touching the first virtual object within the virtual reality environment.

16. The method as described in claim 10, wherein the plurality of attributes includes data describing an input causing the first digital virtual object to be saved in memory of the at least one computing device.

17. The method as described in claim 10, wherein the plurality of attributes includes data describing an input commenting on the first virtual object.

18. The method as described in claim 10, wherein the plurality of attributes includes data describing an input responding to an offer associated with the first virtual object.

19. The method as described in claim 10, wherein the generating includes applying a weighting, differently, to the plurality of attributes.

20. The method as described in claim 10, wherein the log data describes an action performed subsequent to the user interaction with the first virtual object.

* * * * *